3,189,587
EMULSION POLYMERIZATION PROCESS USING SOLUBLE AND INSOLUBLE EMULSIFIERS
Frank J. Donat, Cleveland, Ohio, assignor to The B. F. Goodrich Company, New York, N.Y., a corporation of New York
No Drawing. Filed June 18, 1962, Ser. No. 202,954
20 Claims. (Cl. 260—92.8)

This invention relates to the polymerization of vinyl compounds in aqueous dispersion and more particularly pertains to a method for preparing stable emulsions of synthetic polymers containing a controlled particle size distribution.

The present invention embodies an improved process over those disclosed in copending U.S. patent applications of Frank J. Donat, Serial No. 118,770, filed June 22, 1961, Frank J. Donat and Edward H. Baker, Serial No. 162,223, filed December 26, 1961, Serial No. 188,884, filed April 19, 1962, Serial No. 180,312, filed March 16, 1962, and Serial No. 202,968, filed June 18, 1962.

In the aforementioned copending patent applications it has been shown that certain types of vinyl polymers can be prepared in the form of spherical, uniform particles of controlled size by the use of an "insoluble soap" as the sole emulsifier in an aqueous medium.

The use of materials commonly referred to as "insoluble soaps," "heavy metal soaps," "insoluble metal soaps," "polyvalent metal soaps," "driers" and "metallic soaps," as the sole emulsifiers has not been previously known. The prior art does not teach or suggest that such materials would have any utility, per se, in the polymerization reaction or that they would have any value as emulsifiers in any aqueous system particularly in view of their known limited solubility in water. In the aforementioned copending patent applications it is also shown that in the polymerization of certain vinyl monomers in the presence of an insoluble soap as the sole emulsifier it is necessary to use extreme care in the type and degree of agitation used during the polymerization reaction. The emulsions formed in the presence of an "insoluble soap" as the sole emulsifier are "shear unstable" and it has been shown that the polymer can be isolated from its emulsion simply by a high shear treatment which is a decided advantage in the production of electrical grade resins which are substantially free of electrolytes. It is disadvantageous in many instances, however, to work with emulsions which are sensitive to shear and this problem was solved by the improved process disclosed and claimed in my copending patent application Serial No. 202,955, filed June 18, 1962. In my copending application I teach the process for preparing controlled, uniform particle size synthetic resins in the form of stable aqueous emulsions by initiating the emulsion polymerization of one or more vinyl monomers in an aqueous medium in the presence of an insoluble soap as the sole emulsifier followed by the subsequent addition at some finite conversion of a soluble emulsifier while the polymerization is still progressing.

The present invention embodies a process which produces a stable emulsion of a synthetic vinyl polymer containing at least two families of particles at least one of which has a high degree of uniformity of particle size. The present invention encompasses initiation of the polymerization of one or more vinyl monomers in an aqueous medium in the presence of an insoluble soap as the sole emulsifier and subsequently adding at some finite conversion a controlled excess of a soluble emulsifier while the polymerization is still progressing to produce a stable polymer emulsion having at least two discrete families of particles, at least one of which possesses a high degree of uniformity of size.

The insoluble soap emulsifiers useful in the initiation step of the present invention include the lithium and polyvalent metal salts of saturated, unsaturated and substituted fatty acids. The polyvalent metal moieties of the soaps embodied herein include in general the metals of groups II, III and IV of the Mendeléef periodic table and more particularly include beryllium, barium, calcium, magnesium, strontium, cadmium, zinc, lead, tin, titanium and aluminum. The fatty acid moieties preferred in the insoluble soaps embodied herein are octanoic, stearic, oleic, linoleic, ricinoleic, palmitic, abietic, and the like. Most preferred are the monobasic saturated fatty acids having from 8 to 22 carbon atoms.

Also included in the present invention are the aforementioned polyvalent metal salts of organic sulfates such as barium lauryl sulfate and other hydrocarbon sulfates containing from 8 to 22 carbon atoms and the like. Mixtures of the foregoing insoluble soaps and sulfates may be employed but are less preferred in the process of this invention. The insoluble soaps embodied herein are most useful in the range of from 0.075 part to 3 parts by weight (per 100 parts by weight of monomer or monomers) and preferably from 0.1 to 1.0 part.

Most preferred in this invention are the insoluble soaps having the formula $(A-COO)_nM$ wherein A is an alkyl group having from 7 to 21 carbon atoms, M is a member selected from the group consisting of lithium, barium, calcium, magnesium, cadmium, zinc, lead, tin and aluminum and $n$ is a whole number equal to the valence of M.

The soluble emulsifiers useful herein include the well-known cationic, anionic and non-ionic types of emulsifiers and surface active agents.

Conventional emulsifiers are sometimes subdivided into wetting agents, stabilizers, detergents, suspending agents, etc. An emulsifier is used in an emulsion formulation to increase the ease of formation of the emulsion and to promote the stability of the emulsion. These actions are usually accompanied by reduction of interfacial tension between the two phases and by protective colloid behavior, respectively.

Emulsifiers may be divided according to their behavior into ionic and non-ionic. The ionic type of emulsifier is composed of an organic lyophilic group and a hydrophilic group. The ionic types may be further divided into anionic and cationic, depending upon the nature of the ion-active group. The lyophilic portion of the molecule is usually considered to be the surface-active portion. Thus, in soap the surface active fatty acid portion of the molecule represents the anion in the molecule, and, therefore, soaps are classified as anionic emulsifiers. As would be expected, anionic and cationic surface-active agents are not mutually compatible. Owing to opposing ionic charges they tend to neutralize each other, and their surface-active effect is nullified.

Non-ionic emulsifiers are completely covalent and show no apparent tendency to ionize. They may, therefore, be combined with other non-ionic surface-active agents and with either anionic or cationic agents as well. The non-ionic emulsifiers are likewise more immune to the action of electrolytes than the anionic surface active agents.

Representative cationic emulsifying agents include the long chain quaternary salts such as cetyltriethyl-ammonium chloride, the alkyl dimethylbenzyl-ammonium chlorides, and the like. Anionic emulsifiers include sodium stearate, potassium laurate, morpholine oleate, sodium lauryl sulfate, sodium 2-ethyl hexyl sulfate, sodium xylene sulfonate, sodium naphthalene sulfonate, sodium alkyl naphthalenesulfonate, sodium sulfosuccinate, sodium oleic acid sulfonate, sodium caster oil sulfonate, glycerol monostearate containing a sodium fatty alcohol sulfate, glycerol monostearate containing a soap, and the like. Nonionic emulsifiers include the polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylene-polyol fatty acid esters, polyol fatty acid monoesters, polyhydric alcohol fatty acid di-, tri- etc., esters cholesterol and fatty acid esters, oxidized fatty acids and the like.

Other emulsifiers, surface active agents and surfactants embodied herein may be found in "Encyclopedia of Chemical Technology" by Kirk and Othmer, Interscience Encyclopedia, Inc., New York, 1950, volume 13, pages 513–536; "Soap and Chemical Specialties," December 1957, pages 59–68, January 1958, pages 45–62, February 1958, pages 53–70, March 1958, pages 59–74 and April 1958, pages 55–67; the textbook "Emulsions: Theory and Practice," by Paul Becher, Reinhold Publishing Corp., New York, 1957, particularly pages 237–367.

The vinyl monomers embodied herein are those having a single polymerizable $CH_2=C<$ grouping and which are polymerizable in aqueous emulsion systems such as vinyl chloride, vinylidene chloride, vinyl acetate, methyl methacrylate, styrene and the like and their equivalents. Most preferred as vinyl monomers in the present process are members selected from the group consisting of vinyl chloride, vinylidene chloride, vinyl acetate, methyl methacrylate, and styrene and mixtures thereof. Useful copolymers of the foregoing specific monomers within the present invention are those resulting from the copolymerization of at least 70% by weight of one of the foregoing specific monomers and up to 30% by weight of at least one other monoolefinically unsaturated monomer copolymerizable therewith.

Most preferred as the vinyl polymers embodied in the novel process of this invention are the polymers of from 70 to 100% by weight of at least one member selected from the group consisting of vinyl chloride, vinylidene chloride, vinyl acetate, methyl methacrylate and styrene and from 0 to 30% by weight of at least one other monoolefinically unsaturated monomer copolymerizable therewith.

Among the other monomers useful in minor proportions in copolymerization with the specific monomers embodied herein and set forth above are the other vinyl halides such as vinyl bromide, vinyl fluoride, vinylidene bromide, vinylidene fluoride, chlorotrifluoroethylene, 1,2-dichloroethylene, and the like; other vinyl esters such as vinyl propionate, vinyl butyrate, vinyl benzoate, vinyl laurate, isopropenyl acetate, isopropenyl caproate, and the like; the acrylate and other methacrylate esters such as methyl acrylate, ethyl acrylate, propyl acrylate, isopropyl acrylate, the butyl acrylates, the amyl acrylates the hexyl acrylates, the heptyl acrylates, the octyl acrylates, the dodecyl acrylates, phenyl acrylate, cyclohexyl acrylate, ethyl methacrylate, the propyl methacrylates, the butyl methacrylates, the amyl methacrylates, the hexyl methacrylates, the heptyl methacrylates, the octyl methacrylates, the nonyl methacrylates, the decyl methacrylates, the dodecyl methacrylates, phenyl methacrylate, cyclohexyl methacrylate, and the like; the maleate and fumarate esters such as diethyl maleate, the dipropyl maleates, the dibutyl maleates, the diamyl maleates, the diphenyl maleates, the dioctyl maleates, the dilauryl maleates, dimethyl fumarate, diethyl fumarate, the dipropyl fumarates, the dibutyl fumarates, the diheptyl fumarates, the dioctyl fumarates, dicyclohexyl fumarate, diphenyl fumarate, and the like; the monoolefins such as ethylene, propylene, the butylenes, the amylenes, the hexylenes, cyclohexene, and the like; the vinyl ethers such as vinyl methyl ether, vinyl ethyl ether, the vinyl propyl ethers, the vinyl butyl ethers, the vinyl amyl ethers, the vinyl hexyl ethers, the vinyl octyl ethers, vinyl cyclohexyl ether, vinyl phenyl ether, vinyl benzyl ether, and the like; the allyl esters and ethers such as allyl acetate, allyl laurate, allyl benzoate, allyl methyl ether, allyl ethyl ether, and the like; vinyl cyanides such as acrylonitrile, methacrylonitrile, fumaronitrile, and the like; alpha, beta-olefinically unsaturated carboxylic acids and anhydrides thereof including acrylic acid, methacrylic acid, maleic acid, itaconic acid, citraconic acid, aconitric acid, and the like; alpha, beta-olefinically unsaturated acid amides such as acrylamide, methacrylamide, N-methyl acrylamide, N,N-diethyl acrylamide, N,N-dipropyl methacrylamide, N-phenyl acrylamide, and the like and others.

In the process of this invention the polymerization of one or more vinyl monomers is initiated with a polymerization initiator in an aqueous medium in the presence of an insoluble soap which is the only emulsifier. As the polymerization proceeds to some finite conversion, and preferably from 1 to 50% by weight conversion of monomers to polymer based on the total monomers present, a conventional emulsifier is added to the polymerization mixture in an excess of the amount necessary to just stabilize the polymer particles present in the polymerization mixture so that some free emulsifier is present to initiate the growth of new polymer particles. The addition of the conventional emulsifier may be done in one or more batch type additions or it may be done continuously provided it is not started before about 1% conversion of monomers to polymer has occurred in the presence of an insoluble soap as the sole emulsifier and also providing that an excess of from about 2 to 50% by weight of conventional emulsifier is employed over and above that required for stabilization of the polymer particles present at the time of addition.

The present invention is a novel process for initiating a controlled number of uniform sized particles of polymer, maintaining these particles in a stabilized condition so that they continue to grow in a uniform manner during the course of the polymerization reaction and at some conversion, preferably from about 1 to 50%, initiating at least one new family of smaller particles in the same polymerization reaction and allowing the new family or families of particles to grow and be maintained in a stable condition so that the final polymer emulsion contains a mixture of at least two discrete families of polymer particles, at least one of which is of uniform particle size. Such mixtures are valuable for use in plastisols because it is known that mixtures of large and small particles in suspension in a plasticizer, for instance, possesses highly desirable flow properties as taught by U.S. Patent No. 2,553,916, for instance.

One embodiment of the present process involves the sequential steps of (1) conducting the polymerization of one or more vinyl monomers, vinyl chloride for instance, in an aqueous medium in the substantial absence of oxygen at a temperature of from about 0° C. or lower to 100° C. or higher in the presence of an insoluble soap as the sole emulsifier until the conversion of monomer to polymer has reached a value of from about 1 to 50% and then (2) removing an aliquot sample from the polymerization mixture, carefully degassing the mixture, cooling the sample to room temperature and titrating the sample latex with a standard solution of a conventional emulsifier, plotting surface tension vs. conventional emulsifier concentration and (3) adding conventional emulsifier to the polymerization in excess of the concentration calculated at the break point in the plot of surface tension vs. conventional emulsifier concentration and allowing the polymerization to proceed to the desired conversion. The foregoing steps (2) and (3) may be repeated more than once during the polymerization. When higher polymerization temperatures are employed, i.e. above about 50° C., the titration of step (2) above should be conducted at the polymerization temperature in order to correct for surface tension variation.

It is apparent that the foregoing process may also be carried out in a routine fashion after enough experimental data of the foregoing type have been obtained for a given recipe simply by (1) initiating the polymerization of vinyl chloride in an aqueous medium in the presence of an insoluble soap as the sole emulsifier and allowing the polymerization to proceed to some finite degree of conversion (2) determine the degree of conversion by such means as pressure drop, total solids measurement, etc. and then add conventional emulsifier in an amount previously calculated to be the required excess amount for a given conversion.

In the following illustrative examples the amounts of ingredients are expressed as parts by weight unless otherwise indicated.

EXAMPLE I

A 2-quart capacity stainless steel lined reactor equipped with baffle stirrer having a 3-inch anchor and a pressure gauge was charged with the following ingredients.

|  | Parts | Actual weight, in grams |
|---|---|---|
| Vinyl chloride | 100 | 400 |
| Distilled water | 200 | 800 |
| $K_2S_2O_8$ | 0.075 | 0.3 |
| Lithium stearate | 0.25 | 1.0 |
| Calcium octanoate | 0.11 | 0.44 |

Before adding the vinyl chloride monomer the reactor was swept free of air with a nitrogen purge and the polymerization reaction was carried out at about 50° C. with 300 to 350 r.p.m. agitation of the stirrer. At some finite conversion (in other words, at some time shortly after the commencement of the polymerization reaction) a 20 gram sample of the reaction mixture was removed from the reactor by means of a veterinary syringe (pressure type) and the exact weight of the sample was determined. The sample was then carefully degassed (vinyl chloride monomer was carefully vented from the syringe) and then was adjusted to room temperature. The surface tension of the sample was then measured by means of a Cenco Du Nuöy Interfacial Tensiometer. Small increments of an aqueous standard emulsifier solution were then added to the sample, the sample was stirred thoroughly after each addition and the surface tension of the sample was again measured. In this manner a plot of surface tension vs. volume of the standard emulsifier solution was made and it was found that a straight line curve resulted with a sharp break and levelling off once an excess of emulsifier was present in the sample. The volume of standard emulsifier at the break in the straight line curve in the graph was then determined, the optimum volume of standard emulsifier to be added to just stabilize the particles present was determined and a predetermined excess over this optimum volume of standard emulsifier was added to the polymerization mixture. The optimum amount of standard emulsifier needed for addition to the polymerization reaction mixture for stabilization without the initiation of any new particles was determined as follows:

$$\frac{\text{Weight of contents of reactor}}{\text{(Weight of sample)}} (\text{latex}) \times$$
volume of standard emulsifier (found by titration) = optimum volume of standard emulsifier to be added to reactor The "weight of contents of reactor" in the foregoing equation is determined as follows:

Weight of contents of reactor = original weight of all ingredients charged less combined weight of all samples removed from reactor Another method for determining the optimum amount of standard emulsifier to be added to the reactor is as follows:

$$\frac{\text{Weight of latex only in reactor}}{\text{Weight of degassed sample}} \times$$
volume of standard emulsifier (found by titration)

wherein "weight of latex only in reactor" is determined from total solids measurement, or less accurately, by pressure drop data. The results of several polymerizations carried out in the foregoing manner are summarized in Table 1. The standard emulsifier solution used was a 5% aqueous solution of potassium laurate.

The particle size and shape was determined by taking a small sample of the latex, diluting it with distilled water, depositing a small amount of the diluted latex onto a copper grid, carefully drying and taking an electron photomicrograph of the deposited particles using a Phillips Model E.M. 100B electron microscope.

*Table 1*

| Percent conversion at time of injection | Parts emulsifier, per 100 parts resin | Percent excess of emulsifier | Final percent conversion | Particle sizes | | Total polymerization time, hours |
|---|---|---|---|---|---|---|
|  |  |  |  | Large | Small |  |
| 9.22 | 0.80 | 10 | 80 | 7,800 A., uniform | 1,050 A., fairly uniform | 13.3 |
| 14.5 | 0.84 | 15 | 87.2 | 7,800 A., uniform | 800 A., not uniform | 13.25 |
| 17.3 | 0.99 | 20 | 82 | 7,800 A., uniform | 650 A., not uniform | 12.4 |
| 18.0 | 1.35 | 25 | 68.3 | 4,800 A., uniform | 400 A., not uniform | 10.2 |

*Table 2*

| Percent conversion at time of injection | Parts emulsifier, per 100 parts resin | Percent excess of emulsifier | Final percent conversion | Particle sizes | | Total polymerization time, hours |
|---|---|---|---|---|---|---|
|  |  |  |  | Large | Small |  |
| 17.2 | 0.375 | 25 | 46.5 | 4,200 A., uniform | 300–400 A., not uniform | 11 |
| 15.0 | 0.290 | 20 | 75 | 6,900 A., uniform | 600 A., not uniform | 13.5 |
| 21.2 | 0.375 | 15 | 83 | 6,500 A., uniform | 800 A., not uniform | 10.5 |
| 13.0 | 0.236 | 7 | 80 | 8,000 A., uniform | 2,000 A., fairly uniform | 13.0 |

EXAMPLE II

The procedures of Example I were repeated except that a 2% aqueous solution of sodium lauryl sulfate was used as the standard emulsifier solution. The results of several experiments are given in Table 2.

EXAMPLE III

The procedure of Example I was repeated employing the following recipe:

| Vinyl chloride | 100 |
|---|---|
| Distilled water | 100 |
| $K_2S_2O_8$ | 0.025 |
| Calcium octanoate | 0.055 |

The standard emulsifier used was a 4% aqueous solution of potassium laurate. Several experiments were carried out and in each two injections of the standard emulsifier were made. The first injection was of an excess of standard emulsifier and the second injection at a higher conversion was of the theoretical amount of emulsifier needed just to protect all the particles present in the polymerization medium. The results of these experiments are given in Table 3.

*Table 3*

| Percent conversion at first injection | Percent conversion at second injection | Percent excess of standard emulsifier | Final percent conversion | Particle sizes | | Total polymerization time, hours |
|---|---|---|---|---|---|---|
| | | | | Large | Small | |
| 0.732 | 7 | 7 | 44 | 5,800 A., uniform | 1,050 A., fairly uniform | 11 |
| 0.740 | 15 | 5 | 57 | 6,000 A., uniform | 1,600 A., fairly uniform | 14.75 |
| 1.22 | 20 | 3 | 77 | 8,100 A., uniform | 1,600 A., uniform | 14.5 |

EXAMPLE IV

The procedure of Example I was repeated employing the following recipe:

Styrene _____ 100
Distilled water _____ 300
Barium laurate _____ 0.50
$K_2S_2O_8$ _____ 0.15

The polymerization was carried out at 75° C. The water, barium laurate and $K_2S_2O_8$ were charged in the reactor, the temperature was brought to 75° C. and nitrogen was bubbled through the reaction mixture continuously throughout the polymerization. Stirring was commenced and the styrene was metered into the reaction mixture at the rate of about 10 drops/min. during the course of the polymerization. The standard emulsifier used in the titrations and injections was a 2% aqueous solution of potassium laurate. The first injection of standard emulsifier was made at 2.12% conversion and a 10% by weight excess of soap was used (0.80 part). The particle size at the time of the first injection was 2,200 A. and uniform. The second injection of standard emulsifier was made at 5.77% conversion and a 10% by weight excess of emulsifier (based on titration) was used. The latex particles at the time of the second injection were in two uniform families, the large particles were uniform spheres 3,700 A. in diameter and the small particles were uniform and 2,200 A. in diameter. The polymerization was carried to 100% conversion and the final latex consisted of three discrete families of uniform particles, the large particles were 8,100 A. in diameter, the intermediate particles were 5,600 A. in diameter and the small particles were 3,000 A. in diameter.

I claim:

1. The process comprising initiating a polymerization of monomer consisting of from 70 to 100% by weight of at least one vinyl monomer selected from the group consisting of vinyl chloride, vinylidene chloride, vinyl acetate, methyl methacrylate and styrene and from 0 to 30% by weight of at least one other monoolefinically unsaturated monomer copolymerizable with said vinyl monomer in an aqueous emulsion system, in an aqueous medium in admixture with a free-radical catalyst and at least one insoluble soap having the structure $(A-COO)_nM$ wherein A is an alkyl group having from 7 to 21 carbon atoms, M is a member selected from the group consisting of lithium, barium, calcium, magnesium, cadmium, zinc, tin and aluminum and $n$ is a whole number equal to the valence of M, and subsequently adding, during the course of the polymerization and at some finite degree of conversion which is equivalent to at least about a 1% conversion of monomer to polymer, from about 2 to 50% by weight of a controlled excess of a soluble emulsifier over the amount sufficient to stabilize the existing polymer particles, thereby causing the nucleation of new polymer particles and the production of a stable polymer emulsion of at least two families of polymer particles, at least one of which is composed of particles of uniform size.

2. The process of claim 1 wherein the insoluble soap is present in the range of from 0.075 to 3 parts by weight per 100 parts by weight of monomer.

3. The process of claim 2 wherein there is a substantial absence of oxygen and a temperature of from about 0° C. to 100° C. is employed.

4. The process of claim 3 wherein the finite degree of conversion is from 1 to 50% conversion of monomer to polymer.

5. The process of claim 4 wherein the vinyl monomer is vinyl chloride, the insoluble soap is a mixture of lithium stearate and calcium octanoate and the soluble emulsifier is potassium laurate.

6. The process of claim 4 wherein the vinyl monomer is vinyl chloride, the insoluble soap is a mixture of lithium stearate and calcium octanoate and the soluble emulsifier is sodium lauryl sulfate.

7. The process of claim 4 wherein the vinyl monomer is vinyl chloride, the insoluble soap is calcium octanoate and the soluble emulsifier is potassium laurate.

8. The process of claim 4 wherein the vinyl monomer is styrene, the insoluble soap is barium laurate and the soluble emulsifier is potassium laurate.

9. The process comprising initiating a polymerization of monomer consisting of from 70 to 100% by weight of at least one vinyl monomer selected from the group consisting of vinyl chloride, vinylidene chloride, vinyl acetate, methyl methacrylate and styrene and from 0 to 30% by weight of at least one other monoolefinically unsaturated monomer copolymerizable with said vinyl monomer in an aqueous emulsion system, in an aqueous medium in admixture with a free-radical catalyst and at least one insoluble soap which is the salt of a polyvalent metal and a fatty acid having from 8 to 22 carbon atoms, and subsequently adding, during the course of the polymerization and at some finite degree of conversion which is equivalent to at least about a 1% conversion of monomer to polymer, from about 2 to 50% by weight of a controlled excess of a soluble emulsifier over the amount sufficient to stabilize the existing polymer particles, thereby causing the nucleation of new polymer particles and the production of a stable polymer emulsion of at least two families of polymer particles, at least one of which is composed of particles of uniform size.

10. The process of claim 9 wherein the insoluble soap is present in the range of from 0.075 to 3 parts by weight per 100 parts by weight of monomer.

11. The process of claim 10 wherein there is a substantial absence of oxygen and a temperature of from about 0° C. to 100° C. is employed.

12. The process of claim 11 wherein the finite degree of conversion is from 1 to 50% conversion of monomer to polymer.

13. The method of claim 12 wherein the insoluble soap is a salt of barium and a fatty acid having from 8 to 22 carbon atoms.

14. The method of claim 12 wherein the insoluble soap is a salt of aluminum and a fatty acid having from 8 to 22 carbon atoms.

15. The method of claim 12 wherein the insoluble soap is a salt of cadmium and a fatty acid having from 8 to 22 carbon atoms.

16. The method of claim 12 wherein the insoluble soap is a salt of calcium and a fatty acid having from 8 to 22 carbon atoms.

17. The method of claim 12 wherein the insoluble soap is a salt of lead and a fatty acid having from 8 to 22 carbon atoms.

18. The method of claim 12 wherein the insoluble soap is a salt of magnesium and a fatty acid having from 8 to 22 carbon atoms.

19. The method of claim 12 wherein the insoluble soap is a salt of tin and a fatty acid having from 8 to 22 carbon atoms.

20. The method of claim 12 wherein the insoluble soap is a salt of zinc and a fatty acid having from 8 to 22 carbon atoms.

References Cited by the Examiner
UNITED STATES PATENTS

| | | | |
|---|---|---|---|
| 2,485,616 | 10/49 | Long et al. | 260—92.8 |
| 2,523,289 | 9/50 | Frolich | 260—96 |
| 2,569,447 | 10/51 | Borglin et al. | 260—92.8 |
| 2,934,529 | 4/60 | Van Dijk | 260—92.8 |
| 2,981,724 | 4/61 | Holdsworth | 260—92.8 |

JOSEPH L. SCHOFER, *Primary Examiner.*

J. R. LIBERMAN, WILLIAM H. SHORT, *Examiners.*